United States Patent
Döbbeler et al.

(10) Patent No.: US 9,175,359 B2
(45) Date of Patent: Nov. 3, 2015

(54) METHOD FOR OPERATING AN ARC FURNACE COMPRISING AT LEAST ONE ELECTRODE, REGULATING AND/OR CONTROL DEVICE, MACHINE-READABLE PROGRAM CODE, DATA CARRIER AND ARC FURNACE FOR CARRYING OUT SAID METHOD

(75) Inventors: Arno Döbbeler, Herzogenaurach (DE); Klaus Krüger, Hamburg (DE); Thomas Matschullat, Eckental (DE); Detlef Rieger, Baldham (DE)

(73) Assignee: SIEMENS AKTIENGESELLSCHAFT, Munich (DE)

(*) Notice: Subject to any disclaimer, the term of this patent is extended or adjusted under 35 U.S.C. 154(b) by 1328 days.

(21) Appl. No.: 12/865,300

(22) PCT Filed: Jan. 12, 2009

(86) PCT No.: PCT/EP2009/050241
§ 371 (c)(1), (2), (4) Date: Jul. 29, 2010

(87) PCT Pub. No.: WO2009/095292
PCT Pub. Date: Aug. 6, 2009

(65) Prior Publication Data
US 2011/0007773 A1    Jan. 13, 2011

(30) Foreign Application Priority Data

Jan. 31, 2008  (DE) .................. 10 2008 006 958

(51) Int. Cl.
*H05B 7/18* (2006.01)
*F27D 25/00* (2010.01)
(Continued)

(52) U.S. Cl.
CPC ............ *C21C 5/5211* (2013.01); *F27B 3/28* (2013.01); *F27D 19/00* (2013.01); *F27D 21/04* (2013.01); *Y02W 30/54* (2015.05)

(58) Field of Classification Search
CPC ........ H05B 7/148; H05B 7/20; C21C 5/5211; C21C 5/5205; F27B 3/28; F27D 19/00; F27D 21/04; Y02W 30/54
USPC ............ 373/60, 62, 104, 105, 44, 45, 81, 63, 373/79; 75/386, 10.12, 10.13, 375; 266/81, 266/80, 90
See application file for complete search history.

(56) References Cited

U.S. PATENT DOCUMENTS

| 4,135,052 A | 1/1979 | Stenkvist et al. ............. 373/108 |
| 4,656,331 A | 4/1987 | Lillquist et al. .......... 219/121.47 |

(Continued)

FOREIGN PATENT DOCUMENTS

| CN | 1379826 A | 11/2002 | ............. C21B 13/12 |
| CN | 1429918 A | 7/2003 | ................ C21C 5/52 |

(Continued)

OTHER PUBLICATIONS

English translation of Matschullat, DE 102005034378; Jan. 2007.*
(Continued)

*Primary Examiner* — Hung D Nguyen
(74) *Attorney, Agent, or Firm* — Slayden Grubert Beard PLLC

(57) ABSTRACT

In a method for operating an arc furnace (2) with at least one electrode (3a, 3b, 3c), a solid material fed to the arc furnace (1) is melted by an arc (1) formed by the at least one electrode (3a, 3b, 3c). A measurement (MM) for the mass of one part of the solid material arranged on a boundary (2) of the arc furnace (1) is determined, and using the determined measurement (MM), a process variable of the arc furnace (1) is controlled and/or regulated. A method which can reduce the risk of electrode damage caused by metal scraps falling into the treated area is provided.

13 Claims, 3 Drawing Sheets

(51) Int. Cl.
*H05B 7/148* (2006.01)
*C21C 5/52* (2006.01)
*F27B 3/28* (2006.01)
*F27D 19/00* (2006.01)
*F27D 21/04* (2006.01)

(56) References Cited

U.S. PATENT DOCUMENTS

| | | | |
|---|---|---|---|
| 5,050,185 A | 9/1991 | Bourge et al. | 373/104 |
| 5,331,661 A | 7/1994 | Maguire et al. | 373/105 |
| 5,527,387 A | 6/1996 | Anderson et al. | 106/693 |
| 5,533,044 A * | 7/1996 | Strebel | 373/104 |
| 5,611,838 A * | 3/1997 | Fritz et al. | 75/10.38 |
| 7,217,121 B2 | 5/2007 | Thomson et al. | 431/12 |
| 2006/0060574 A1 | 3/2006 | Blankenship et al. | 219/130.21 |
| 2008/0198894 A1* | 8/2008 | Matschullat | 373/104 |
| 2008/0285615 A1 | 11/2008 | Fink et al. | 373/104 |
| 2008/0304538 A1 | 12/2008 | Schubert | 373/96 |
| 2008/0307926 A1 | 12/2008 | Matschullat | 75/386 |

FOREIGN PATENT DOCUMENTS

| | | | | |
|---|---|---|---|---|
| DE | 4425089 | | 1/1996 | C21C 5/52 |
| DE | 29713666 | | 11/1997 | F27D 21/00 |
| DE | 19801295 | | 7/1999 | F27B 3/28 |
| DE | 102005034409 | | 5/2006 | C21C 5/52 |
| DE | 102005034378 | | 1/2007 | C21C 5/52 |
| EP | 0403413 | | 6/1990 | H05B 7/144 |
| EP | 0637634 | | 8/1994 | C21C 5/52 |
| FR | 2670571 | | 6/1992 | F27B 3/28 |
| JP | 2008115408 | | 5/2008 | C21C 5/52 |
| RU | 2180923 | C1 | 3/2002 | C21C 5/52 |
| SU | 596631 | A1 | 3/1978 | C21C 5/52 |
| SU | 935534 | | 6/1982 | C21C 5/52 |
| WO | 2006131464 | | 12/2006 | C21C 5/52 |
| WO | 2007/009861 | A2 | 1/2007 | C21C 5/52 |
| WO | 2007009924 | | 1/2007 | F27B 3/28 |

OTHER PUBLICATIONS

German Office Action for Application No. 10 2008 006 958.2 (7 pages), Jan. 22, 2009.
German Office Action for Application No. 10 2008 006 965.6 (6 pages), Jan. 27, 2009.
German Office Action for Application No. 10 2008 006 966.3 (6 pages), Dec. 17, 2008.
International Search Report and Written Opinion for Application No. PCT/EP2009/050241 (13 pages), Jun. 3, 2009.
International Search Report and Written Opinion for Application No. PCT/EP2009/050925 (12 pages), Apr. 27, 2009.
International Search Report and Written Opinion for Application No. PCT/EP2009/050243 (12 pages), Aug. 3, 2009.
Matschullat et al., "Foaming Slag and Scrap Melting Behavior in Electric Arc Furnace—A New and Very Precise Detection Method with Automatic Carbon Control" Archives of Metallurgy and Meterials of the Polish Academy of Sciences, Bd. 53, Nr.2, s. 399-403 XP002528409 (5 pages), Mar. 1, 2008.
Thomson. "Electric Furnace Arcs Screening—is with Frothing Agent of Slag Set by Measuring Acoustic Signals at Upper and Lower Limits of Frequencies Range" XP002401121 (1 page), Jan. 1, 1900.
Dmochowski "Hochstrommessungen bei Lichtbogenofen" in Elektrowarme International 39 (1981) B5, S.B. 254 bis B 261 (8 pages), Oct. 1, 1981.
Berg, A.I., "Lexikon der Modernen Technik. Automatisierung der Produktion und Industrieelektronik," Encyclopedia of Modern Technology. Automation of Production Industrial Electronics, 5 pages (w/ English translation), 1965.
Ozhegov, S.I., "Das Wörterbuch der Russischen Sprache," Dictionary of Russian Language, 20$^{th}$ edition, 3 pages (w/ English translation), 1988.

* cited by examiner

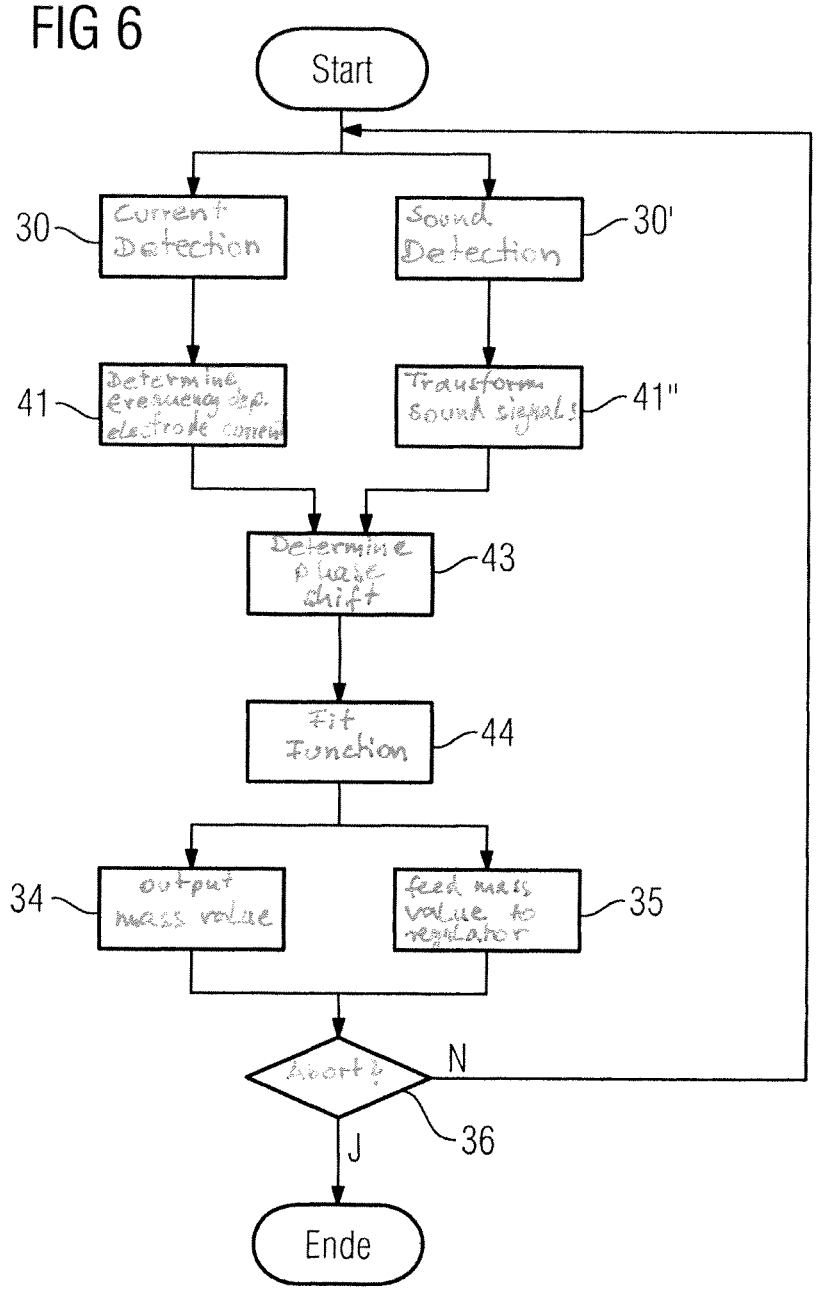

METHOD FOR OPERATING AN ARC FURNACE COMPRISING AT LEAST ONE ELECTRODE, REGULATING AND/OR CONTROL DEVICE, MACHINE-READABLE PROGRAM CODE, DATA CARRIER AND ARC FURNACE FOR CARRYING OUT SAID METHOD

CROSS-REFERENCE TO RELATED APPLICATIONS

This application is a U.S. National Stage Application of International Application No. PCT/EP2009/050241 filed Jan. 12, 2009, which designates the United States of America, and claims priority to DE Application No. 10 2008 006 958.2 filed Jan. 31, 2008. The contents of which are hereby incorporated by reference in their entirety.

TECHNICAL FIELD

The invention relates to a method for operating an arc furnace comprising at least one electrode, the solid material fed to the arc furnace being melted by means of an arc formed by the at least one electrode. Furthermore, the invention relates to an arc furnace, a regulating and/or control device, a machine-readable program code and a data carrier with program code for carrying out said method.

BACKGROUND

An arc furnace serves for producing liquid metal, generally steel. The liquid metal is produced from solid melting charge, for instance scrap or reduced iron, together with further additions. For this purpose, at the beginning of the process the arc furnace is charged with scrap and/or reduced iron and possibly further additions or alloying constituents and then at least one arc is struck between at least one electrode and the solid melting charge. The energy introduced into the arc furnace by the at least one arc leads to the melting of the solid melting charge. During the melting process, additives, such as coal or lime, or alloying elements may generally also be fed to the arc furnace.

The melting process in the arc furnace is generally accompanied by acoustic phenomena, since the melting charge inside the arc furnace moves during the melting process. These phenomena may, for example, be caused to varying extents by the burning of the arc, by chemical reactions or else by scrap collapses.

Particularly scrap collapses during the melting process are problematic, since—if there is a correspondingly great moving mass—they can lead to damage or rupture of an electrode in the arc furnace.

SUMMARY

According to various embodiments, a method with which an arc furnace can be operated more reliably can be provided. Furthermore, according to other embodiments, an arc furnace suitable for carrying out the method and also a regulating and/or control device making the method happen, a storage medium and a program code for this can be provided.

According to an embodiment, in a method for operating an arc furnace comprising at least one electrode, the solid material fed to the arc furnace is melted by means of an arc formed by the at least one electrode, wherein a measure of the mass of part of the solid material that is caked on an enclosure of the arc furnace is determined and a process variable of the arc furnace is controlled and/or regulated on the basis of the measure determined.

According to a further embodiment, a model that can be applied to enforced oscillations may be used for determining the measure of the mass of the part of the solid material that is caked on the enclosure. According to a further embodiment, a supplied electrode current can be detected for the at least one electrode, structure-borne sound oscillations of the enclosure can be detected, a frequency-dependent current evaluation signal and a frequency-dependent oscillation evaluation signal can be determined from the detected electrode current and the detected structure-borne sound oscillations, a phase shift between the current evaluation signal and the oscillation evaluation signal can be respectively determined for a multitude of common frequencies, and the measure of the mass of the part of the solid material that is caked on the enclosure can be determined from the phase shift determined.

According to another embodiment, a regulating and/or control device for an arc furnace with a machine-readable program code which may have control commands that make the regulating and/or control device carry out a method as described above.

According to yet another embodiment, a machine-readable program code for a regulating and/or control device for an arc furnace, may have control commands that make the regulating and/or control device carry out the method as described above.

According to yet another embodiment, a storage medium may comprise a machine-readable program code as described above stored on it.

According to yet another embodiment, an arc furnace may comprise at least one electrode, an electrode current detection device for detecting an electrode current supplied to the at least one electrode, structure-borne sound sensors for detecting structure-borne sound oscillations of an enclosure of the arc furnace, and a regulating and/or control device as described above, the electrode current detection device and the structure-borne sound sensors being operatively connected to the regulating and/or control device.

BRIEF DESCRIPTION OF THE DRAWINGS

Further advantages are evident from the exemplary embodiment, which is explained more precisely below on the basis of the schematic drawings, in which:

FIG. 6 shows a flow diagram to represent the schematic sequence of a method for determining a measure of a mass.

DETAILED DESCRIPTION

Figure 1:
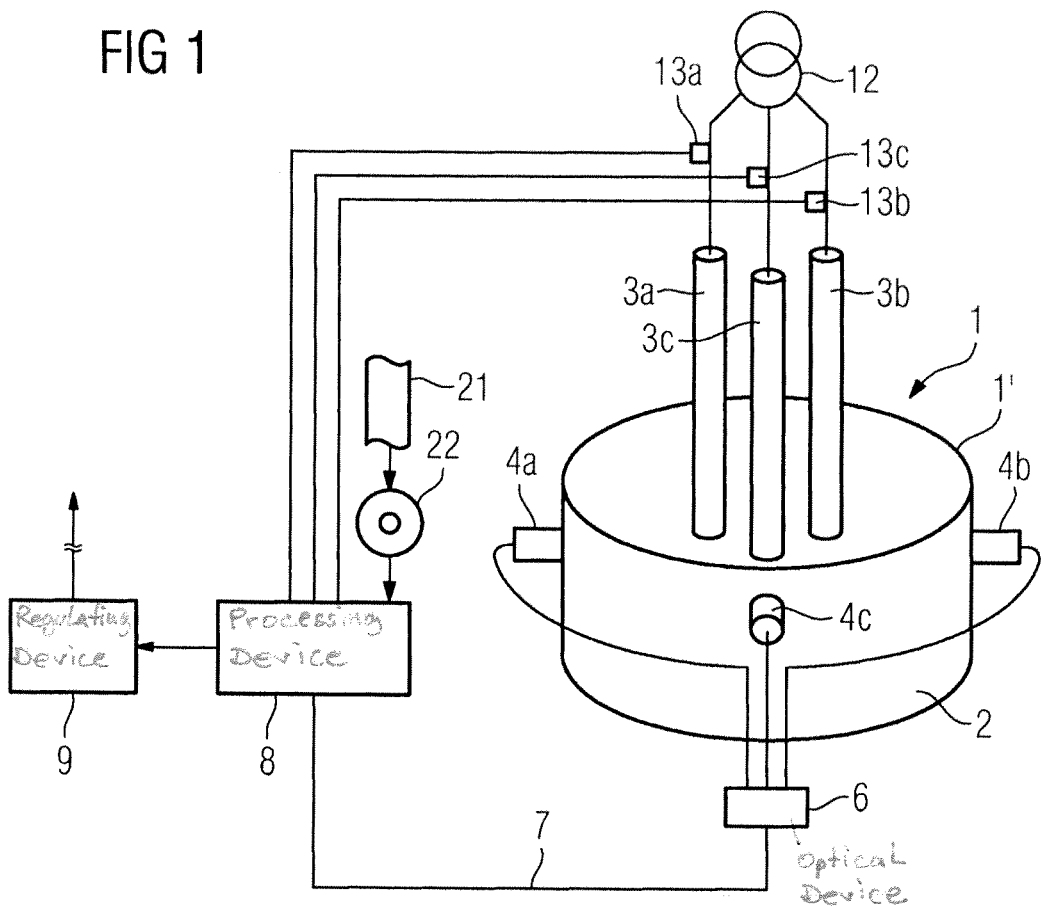
FIG. 1 shows a schematic representation of an arc furnace for carrying out the method according to various embodiments

According to various embodiments, in a method of the type stated at the beginning, a measure of the mass of part of the solid material that is caked on an enclosure of the arc furnace is determined and a process variable of the arc furnace is controlled and/or regulated on the basis of the measure determined. Part of the solid material is understood as meaning a partial amount of the solid material fed into the arc furnace. Part of the solid material should be regarded as caked on the enclosure if, together with an oscillatory enclosure, it forms a coupled oscillatory system. A process variable is understood as meaning any variable that has an influence on the process proceeding in the arc furnace. One or more, i.e. at least one, process variable may be controlled and/or regulated with the measure determined. The process variables can generally be set by manipulated variables. If the measure determined for the mass of the part of the solid material that is caked on the enclosure or a variable derived from it goes above a definable threshold value, it may be envisaged to control and/or regulate a process variable in such a way that any disturbance of the process proceeding as planned in the arc furnace is reduced, in particular minimized or prevented.

Controlling and/or regulating a process variable of the arc furnace on the basis of the measure determined therefore means that the control and/or regulation takes place in some way, indirectly or directly, on the basis of the measure determined. If control and regulation is performed on the basis of a variable derived from the measure, it is nevertheless performed indirectly on the basis of the measure determined.

The vertical electrode position may be mentioned as an example of a process variable that can be set in the above context. If, for example, the measure determined or a variable derived from it goes above a threshold value, it can be assumed that a scrap collapse is imminent. This may cause the electrodes to be damaged. To avoid this, the position of the electrode is, for example, controlled and/or regulated on the basis of the measure determined or the variable derived from it in such a way that the risk of damage to the electrode, in particular electrode rupture, is reduced. This can be achieved by the electrodes being controlled or regulated in dependence on the measure determined or the variable derived from it such that they are moved upward or downward, or scrap collapses that do not have a damaging effect are deliberately brought about.

According to an embodiment, a model that can be applied to enforced oscillations is used for determining the measure of the mass of the part of the solid material that is caked on the enclosure. The pulsating arc may be regarded as the exciter of the forced oscillation. If appropriate, additional exciter units, arranged in particular on the arc furnace, may also be used to excite an enforced oscillation of an oscillating system. The latter alternative for the excitation has the advantage that, by contrast with the arc, the exciter frequency can be set as desired, and consequently can be set individually to the respective circumstances. The excited oscillating system is an oscillatory enclosure of the arc furnace with part of the solid material that is caked on it. The mass of the part of the solid material that is caked on the enclosure consequently influences the oscillation of the oscillating system. By the use of a model of this kind in conjunction with an oscillation analysis based on it, it is possible to determine in a simple manner from the signals originating from the operation of the arc furnace a measure of the mass of part of the solid material that is caked on the enclosure.

In an embodiment, the determination of the measure of the mass of the part of the solid material that is caked on an enclosure comprises the following method steps:

a supplied electrode current is detected for the at least one electrode,
  structure-borne sound oscillations of the enclosure are detected,
  a frequency-dependent current evaluation signal and a frequency-dependent oscillation evaluation signal are determined from the detected electrode current and the detected structure-borne sound oscillations,
  a phase shift between the current evaluation signal and the oscillation evaluation signal is respectively determined for a multitude of common frequencies, and
  the measure of the mass of the part of the solid material that is caked on the enclosure is determined from the phase shift determined. As a result, particularly exact determination of the measure of the mass of the part of the solid material that is caked on an enclosure is made possible, on the basis of which control and/or regulation of a process variable of the arc furnace can be indirectly or directly performed.

The following variables or variables formed from them may be used in particular as frequency-dependent current evaluation signals:

$$I_n(\omega) \propto \int_a^b |I(t)|^n e^{-i\omega t}\, dt,$$

or else $$I_n(\omega) \propto \int_a^b |I(t)|^n e^{-i\omega t}\, dt,$$

where n: parameters, n∈1, 2, 3, . . . , where i: imaginary unit, where e: Euler's number, where t: time, where ω: angular frequency of the electrode current, where I(t): time-dependent, detected electrode current, where I(ω): frequency-dependent electrode current, where a: beginning of the integration interval and b: end of the integration interval. a may be chosen, for example, as minus infinity and b as plus infinity. Alternatively, finite interval limits may also be chosen. The use of Fourier transformation for transforming a signal from the time domain to the frequency domain is optional. Any other transformation that appears suitable to a person skilled in the art may also be used to transform the signals from the time domain to the frequency domain. Preferably, the square of the electrode current, i.e. n=2, or the amount of the electrode current, i.e. n=1, is used as the basis for determining the frequency-dependent current evaluation signal.

The part of the object concerning the regulating and/or control device is achieved by a regulating and/or control device for an arc furnace with a machine-readable program code which has control commands that make the regulating and/or control device carry out a method as defined in the respective claims.

The part of the object concerning the machine-readable program code is achieved by a machine-readable program code for a regulating and/or control device for an arc furnace, the program code having control commands that make the regulating and/or control device carry out the method as defined in the respective claims.

The part of the object concerning the storage medium is achieved by a storage medium defined in the respective claim with a machine-readable program code stored on it.

The part of the object concerning the arc furnace is achieved by an arc furnace comprising at least one electrode, comprising an electric current detection device for detecting an electrode current supplied to the at least one electrode, comprising structure-borne sound sensors for detecting structure-borne sound oscillations of an enclosure of the arc furnace, and comprising a regulating and/or control device, the electrode current detection device and the structure-home sound sensors being operatively connected to the regulating and/or control device.

FIG. 1 shows an electric arc furnace 1 with a number of electrodes 3a, 3b, 3c, which are coupled to a power supply device 12 via supply leads. The power supply device 12 preferably has a furnace transformer.

With the aid of three electrodes 3a, 3b, 3c, charging materials, such as for example steel and/or iron scrap and/or directly reduced iron, if appropriate with alloying agents and/or additives, are melted in the electric arc furnace 1. It has not previously been known on the basis of which variable a collapse of scrap can be predicted. Consequently, it may happen that one or more electrodes 3a, 3b and/or 3c from FIG. 1 is/are damaged, or at worst even ruptured, by a scrap collapse. Electrode damage or electrode rupture causes significant disruption of the melting process, even to the extent that it is aborted, and should therefore be avoided as far as possible. This can be prevented by the method presented below.

In the example shown, electrode current detection devices 13a, 13b, 13c, with the aid of which current and/or voltage or the energy supply to the electrodes 3a, 3b, 3c, can be measured, are provided on the power leads of the electrodes 3a, 3b, 3c. The electrode current detection devices 13a, 13b, 13c are operatively connected to a signal processing device 8. That is to say that there is a contactless or contact-based transmission of signals between at least one electrode current detection device 13a, 13b, 13c and the signal processing device 8. The signals transmitted in this case represent the electrode current detected over time. The transmission of signals of this kind is preferably performed continuously and for all the electrode currents that are supplied to the electrodes 3a, 3b, 3c.

Arranged on a wall 2 or on the panels of the furnace vessel 1', i.e. on the outer enclosure of the furnace vessel 1', are structure-borne sound sensors 4a, 4b, 4c, for detecting oscillations on the furnace vessel 1. The structure-borne sound sensors 4a, 4b, 4c may be arranged such that they are connected indirectly and/or directly to the furnace vessel 1' or to the wall 2 of the furnace vessel 1'. The structure-borne sound sensors 4a, 4b, 4c for measuring structure-borne sound oscillations are preferably arranged at an oscillatory location of the wall 2, substantially directly opposite the respective electrode 3a, 3b, 3c, and at least as many structure-borne sound sensors 4a, 4b, 4c as electrodes 3a, 3b, 3c are preferably provided. Directly opposite means that the structure-borne sound sensors 4a, 4b, 4c on the wall 2 of the furnace vessel 1' are in each case at a minimal distance from a center line of the respectively nearest electrode.

The structure-borne sound sensors 4a, 4b, 4c are operatively connected to a signal processing device 8. That is to say that there is a contactless or contact-based transmission of signals between at least one structure-borne sound sensor 4a, 4b, 4c and the signal processing device 8. The signals transmitted in this case represent the structure-borne sound oscillations detected over time of the wall 2 of the furnace vessel at the location of the structure-borne sound sensor 4a, 4b, 4c. The transmission of signals of this kind is preferably performed continuously.

At least some of the signals that are transmitted from the structure-borne sound sensors 4a, 4b, 4c to the signal processing device 8 are preferably conducted via an optical waveguide 7. At least one optical device 6, which serves for amplifying and/or converting signals of the one or more structure-borne sound sensors 4a, 4b, 4c, is arranged between the optical waveguide 7 and the structure-borne sound sensors 4a, 4b, 4c. Signal lines which conduct the signals of the structure-borne sound sensors 4a, 4b, 4c may be provided in the direct vicinity of the furnace vessel 1' or under some circumstances also directly on the furnace vessel 1'. The signal lines are preferably routed in such a way that they are protected from heat, electromagnetic fields, mechanical loading and/or other loads.

In the signal processing device 8, the measure of the mass of the scrap that is caked on the wall 2 is determined. The measure of the mass determined is then transmitted to a regulating device 9, which uses the measure of the mass for setting a manipulated variable for a process variable of the electric arc furnace 1. In the present exemplary embodiment, the regulating device 9 and the signal processing device 8 form a control device.

For example, the electrode position, in particular the vertical position, of the electrodes 3a, 3b, 3c, may be regulated with the aid of the measure of the mass in such a way that the probability of electrode rupture is low, and at the same time an efficient melting process can take place. If appropriate, shaking of the furnace vessel, preferably together with pulling out of at least one of the electrodes 3a, 3b, 3c, may also be performed as soon as the measure of the mass or a variable derived from it goes above or below a predeterminable threshold value. This causes the part of the solid material that is caked on the wall 2 of the furnace vessel 1' to become detached and distributed uniformly in the furnace vessel 1'. As a result, the risk of a scrap collapse putting the electrodes at risk is reduced. It may also be possible by adding media to the electric arc furnace 1 for the melting charge in the arc furnace 1 to be influenced on the basis of the measure of the mass determined in such a way that the risk of scrap collapse is reduced or scrap collapse occurs in a controlled manner such that the electrodes are not put at risk, or to a reduced extent.

Figure 2:
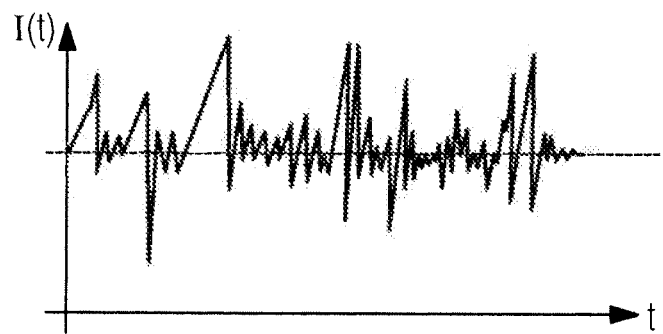
FIG. 2 shows a representation of a detected electrode current signal over time.

The determination of the measure of the mass is explained by way of example in conjunction with FIG. 1 on the basis of the electrode 3a of the electric arc furnace 1. The determination of a measure of the mass preferably takes place continuously during the operation of the electric arc furnace and for all the electrodes 3a, 3b and 3c. The electrode current detected over time for an electrode 3a, detected with the electric current detection device 13a, is represented in FIG. 2.

Figure 3:
FIG. 3 shows a representation of a detected structure-borne sound signal over time.

The measured or detected electrode current is digitized if the data are not already in a digitized form. This takes place by means of an adequately high sampling rate, for example of 12 000 samples per second. The level of the sampling rate is dependent on the changes in the electrode current occurring over time: $dI(t)/dt$. Here, $I(t)$ is the time-variable electrode current signal assigned to the electrode current and t is the time. The more quickly the electrode current changes over time, the higher the sampling rate should generally be chosen in order to detect the changes of the electrode current with corresponding accuracy. If appropriate, the sampling rate may be set dependent on electrode current changes that are to be expected. The same applies analogously to the detected structure-borne sound oscillations of the wall 2 by the structure-borne sound sensors 4a, 4b, 4c. Consequently, a time-resolved structure-borne sound oscillation signal $KS(t)$ is detected, represented by way of example in FIG. 3.

Before the signal processing device 8 is used for evaluating the method, the method is preferably fed once to the signal processing device 8 in the form of a machine-readable program code 21 by means of a storage medium 22, for instance a compact disk, and stored on the programmable signal processing device 8. In this way, the signal processing device 8 is prepared for carrying out a method for determining a measure of the mass in an electric arc furnace 1. The signal processing device 8 is operatively connected to the regulating device 9. The regulating device 9 regulates the manipulated variables for influencing the process variables for the melting process taking place in the arc furnace 1.

The electrode current signals I(t) representing the electrode current are fed to the prepared signal processing device 8. In the signal processing device 8, the electrode current signal I(t) is transformed into the square of the electrode current signal $I^2(t)$ and the squared electrode current signal $I^2(t)$ is transformed from the time domain to the frequency domain, so that a squared electrode current signal $I^2(f)$ divided on the basis of frequency components is obtained, f being a frequency. Synonymously with $I^2(f)$, $I^2(\omega)$ may be determined, where $\omega = 2\pi f$. The transformation of the squared electrode current signal $I^2(t)$ from the time domain to the frequency domain preferably takes place by means of Fourier transformation. However, other transformation methods are possibly also suitable for transforming a signal from a time domain to a frequency domain. These are likewise available to a person skilled in the art. Alternatively, the amount of the time-dependent electrode current may also so be used as a basis for the transformation.

For the detected structure-borne sound oscillation signal KS(t), a Fourier transformation is likewise carried out and a frequency-dependent structure-borne sound oscillation signal is obtained. The signal $KS^n(t)$ with n as parameters is preferably taken as a basis for the Fourier transformation. Advantageously, n=1 is chosen, so that the detected signal can be used directly. However, the amount of the structure-borne sound oscillation to any desired power n may also possibly be used for the evaluation.

Figure 4:
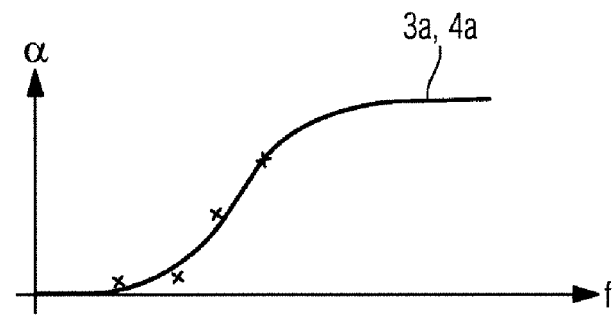
FIG. 4 shows a representation of a frequency-dependent phase shift between a current evaluation signal and an oscillation evaluation signal for common frequencies.

A phase shift α is then respectively determined for the Fourier transform of the squared electrode current and of the detected structure-borne sound for common frequencies, for instance for the integer-frequency harmonics of the double operating frequency $kf_0$, for example with k=1, 2, 3, i.e. 100 Hz, 200 Hz, 300 Hz, of the electrode current signal and of the structure-borne sound signal. The operating frequency is the frequency with which an electrode is subjected to an electrical variable, for instance the voltage or the electrode current. The phase shift α between the electrode current detected by means of the electrode current detection device 13a and the structure-borne sound oscillations detected by means of the structure-borne sound sensor 4a is depicted in FIG. 4 for certain exciter frequencies f. Furthermore, FIG. 4 shows a fit function plotted through the phase shifts α depicted at specific points.

The fit function is based on the equation known from the model for enforced oscillations which describes the phase shifts between the exciter and the oscillating system that occur in the case of enforced oscillations. $\omega_0^2 := k/m$ and a damping constant are used here as fit parameters, K being a spring constant and m being the mass of the oscillating system that is excited by the exciter. After completion of the fit, consequently $\omega_0^2$ may be obtained as a measure of the mass that is caked on the wall of the furnace vessel.

Figure 5:
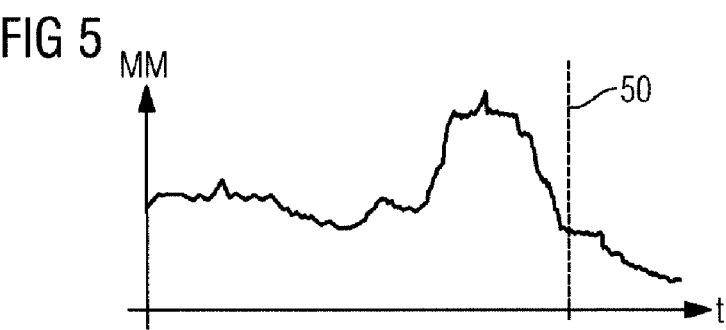
FIG. 5 shows a representation of a measure of the mass of the part of the solid material that is caked on an enclosure of the arc furnace over time.

FIG. 5 shows the variation over time of the measure MM of the mass of part of the solid material lying on a wall 2 of a furnace vessel 1'. With regard to the reference signs of devices, reference is made to FIG. 1. The measure of the mass MM that is shown is based on the data of the electrode current detection device 13a and of the sensor 4a lying opposite the electrode 3a on the wall 2 of the furnace vessel 1'. The measure of the mass MM moves at a relatively constant level at the beginning of the variation over time that is represented.

After a certain time, toward the middle of the time interval represented, there is a significant rise in the measure MM of the mass of the mass that is caked on the wall 2 of the furnace vessel 1'. This means that there is an accumulation of solid material on the wall 2 in a region that has an influence on the structure-borne sound oscillation signals detected by the structure-borne sound sensor 4a. After a certain time period, the measure of the mass MM falls again. The reason for this may be that the part of the solid material that is caked on the furnace wall 2 is beginning to become detached. The oscillating system comprising the wall and the caked part of the solid material is therefore becoming increasingly decoupled. There is consequently then the risk that a scrap collapse or scrap slide is imminent.

The measure of the mass MM then falls relatively sharply with increasing time. A negative change in the measure of the mass MM of a high amount in a short time, i.e. a negative d(MM)/dt of a high amount, may therefore indicate an imminent scrap collapse.

The signal d(MM)/dt may consequently be used to predict scrap collapses, and to control or regulate the arc furnace in such a way as to minimize disturbances of the planned operation of the arc furnace, in particular putting at risk the electrodes by electrode rupture caused by scrap collapses.

At the point in time 50, depicted in FIG. 5, there is a perceptible vibration of the arc furnace that can be detected by operating personnel and is attributable to a scrap collapse. In practice, it has been possible to verify by comparison on the basis of the vibrations occurring that the measure of the mass MM is in fact suitable for predicting scrap collapses. It is consequently possible on the basis of the drop in the measure of the mass to position the electrode 3a or the other electrodes 3b and 3c in time by means of an activation of the corresponding actuating means by the control device or regulating device in such a way that the electrodes are not put at risk of a scrap collapse, or to a lesser extent, while ensuring a substantially unchanged introduction of energy.

The measure of the mass MM is preferably continuously determined and used for regulating or controlling process variables of the arc furnace. In this respect, all available structure-borne sound oscillation signals and detected electrode currents of the respective electrode are advantageously used. In particular, shortly after the beginning of the melting process, i.e. when the solids content of the melting charge in the arc furnace is still high, the method contributes to improving the operation of the furnace.

FIG. 6 shows a flow diagram which represents a sequence of the method given by way of example. It is assumed here that the arc furnace is in operation and that an arc is formed between the electrode and the solid material for melting the solid material.

Firstly, in a method step 30, the electrode current is detected for each electrode of the arc furnace. At the same time, structure-borne sound oscillations are detected by means of structure-borne sound sensors on a wall of the furnace vessel in a method step 30'. The structure-borne sound oscillations of the wall of the furnace vessel are excited by the pulsating arc. Alternatively, an additional exciter unit, which can be tuned in its exciter frequency, may also be used to excite the oscillation. In the exemplary embodiment, the pulsating arc is used as the oscillation exciter.

Then, in a method step 41, a frequency-dependent electrode current evaluation signal is determined from the detected electrode current, for example in the form of the Fourier-transformed squared electrode current or the Fourier-transformed amount of the electrode current. At the same time as this, in a method step 41", the detected structure-borne sound oscillation signals are transformed from the time domain to the frequency domain and in this way the frequency-dependent oscillation evaluation signal is formed.

A phase shift is then respectively determined from the frequency-dependent current evaluation signals and the frequency-dependent oscillation evaluation signals for common frequencies. This takes place in a method step 43. In a method step 44, a fit function, the fitting parameters of which comprise the mass of the part of the solid material that is caked on the wall of the furnace vessel and furthermore the damping of the oscillating system, is fitted to this determined frequency-dependent phase shift. An adaptation of the fit function is performed until the distance of the fit function from the frequency-dependent phase shift determined, i.e. the actual measuring points, is minimal.

The $\omega_0^2 := k/m$ then set, i.e. the natural oscillation angular frequency of the oscillating system in the oscillation differential equation, may then be used as a measure of the mass of the part of the solid material that is caked on the wall, since K can be regarded as constant. It may also be possible to determine from this a further variable which can likewise be used as a measure of the mass.

In a next method step 34, the measure of the mass determined is graphically output, so that the operating personnel can follow the variation over time of the measure of the mass. This particularly allows manual control intervention in the operation of the arc furnace by operating personnel. At the same time, in a method step 35, the measure of the mass determined is fed to a regulating device, which performs control interventions in the operation of the arc furnace on the basis of the measure of the mass fed to it. This allows improved operation of the arc furnace to be achieved, since, in particular, scrap collapses can be predicted and suitable control interventions can be taken before they occur, in order to keep down as much as possible the disturbances of the process that are caused by a scrap collapse.

In a method step 36, it can be decided whether the method should be continued or can be aborted. This may take place manually or automatically. The method can generally be aborted if a large part of the melting charge in the arc furnace has been transformed into the liquid phase. Here there are scarcely any significant scrap collapses that could put the electrodes at risk. The end of the melting is generally automatically detected. This detection may also be used as a criterion for aborting the present method.

What is claimed is:

1. A method for operating an arc furnace comprising at least one electrode, comprising:
   melting solid material fed to the arc furnace by means of an arc formed by the at least one electrode,
   using a model for enforced oscillations to determine a measure of a mass of part of the solid material that is caked on an enclosure of the arc furnace, including:
   generating an current evaluation signal based on a detected current supplied to the at least one electrode,
   generating an oscillation evaluation signal based on detected sound oscillations of the enclosure,
   determining a phase shift between the current evaluation signal and the oscillation evaluation signal at one or more frequencies, and
   calculating the measure of the mass of the part of the solid material that is caked on the enclosure based on the determined phase shift determined, and
   at least one of controlling or regulating a process variable of the arc furnace based on of the mass.

2. The method according to claim 1, wherein
   a supplied electrode current is detected for the at least one electrode,
   structure-borne sound oscillations of the enclosure are detected,
   a frequency-dependent current evaluation signal and a frequency-dependent oscillation evaluation signal are determined from the detected electrode current and the detected structure-borne sound oscillations,
   a phase shift between the current evaluation signal and the oscillation evaluation signal is respectively determined for a multitude of common frequencies, and
   the measure of the mass of the part of the solid material that is caked on the enclosure is determined from the phase shift determined.

3. A regulating and/or control device for an arc furnace, in which solid material fed to the arc furnace is melted by means of an arc formed by the at least one electrode, the device comprising:
   a non-transitory machine-readable program code which has control commands which when executed:
   uses a model for enforced oscillations to determine a measure of a mass of part of a solid material that is caked on an enclosure of the arc furnace, including:
   generating a current evaluation signal based on a detected current supplied to the at least one electrode,
   generating an oscillation evaluation signal based on detected sound oscillations of the enclosure,
   determining a phase shift between the current evaluation signal and the oscillation evaluation signal at one or more frequencies, and
   calculating the measure of the mass of the part of the solid material that is caked on the enclosure based on the determined phase shift determined, and
   at least one of control or regulate a process variable of the arc furnace of the mass.

4. A non-transitory machine-readable medium storing program code for a regulating and/or control device for an arc furnace, in which solid material fed to the arc furnace is melted by means of an arc formed by the at least one electrode, the program code having control commands which when executed:
   uses a model for enforced oscillations to determine a measure of a mass of part of a solid material that is caked on an enclosure of the are furnace, including:
   generating a current evaluation signal based on a detected current supplied to the at least one electrode,
   generating an oscillation evaluation signal based on detected sound oscillations of the enclosure,
   determining a phase shift between the current evaluation signal and the oscillation evaluation signal at one or more frequencies, and
   calculating the measure of the mass of the part of the solid material that is caked on the enclosure based on the determined phase shift determined, and
   at least one of control or regulate a process variable of the arc furnace based on of the mass.

5. The non-transitory machine-readable medium according to claim 4, wherein
   a supplied electrode current is detected for the at least one electrode,
   structure-borne sound oscillations of the enclosure are detected,
   a frequency-dependent current evaluation signal and a frequency-dependent oscillation evaluation signal are determined from the detected electrode current and the detected structure-borne sound oscillations, a phase shift between the current evaluation signal and the oscillation evaluation signal is respectively determined for a multitude of common frequencies, and the measure of the mass of the part of the solid material that is caked on the enclosure is determined from the phase shift determined.

6. An arc furnace comprising at least at least one electrode, comprising an electrode current detection device for detecting an electrode current supplied to the at least one electrode, comprising structure-borne sound sensors for detecting structure-borne sound oscillations of an enclosure of the arc furnace, and comprising a device for at least one of regulating and control, the device comprising:

a non-transitory machine-readable program code which has control commands which when executed:

uses a model for enforced oscillations to determine a measured of a mass of part of a solid material that is caked on an enclosure of the arc furnace, including:

generating a current evaluation signal based on a detected current supplied to the at least one electrode, generating an oscillation evaluation signal based on detected sound oscillations of the enclosure, determining a phase shift between the current evaluation signal and the oscillation signal at one or more frequencies, and calculating the measure of the mass of the part of the solid material that is caked on the enclosure based on the determined phase shift determined, and at least one of control or regulate a process variable of the arc furnace based on the determined measure of the mass, the electrode current detection device and the structure-borne sound sensors being operatively connected to the device.

7. The arc furnace according to claim 6, wherein the structure-borne sound sensors are arranged on said enclosure of the arc furnace and at least one structure-borne sound sensor is associated with the at least one electrode and arranged on said enclosure at a position that is closest to the at least one electrode.

8. The regulating and/or control device according to claim 7, wherein the device is configured to detect a supplied electrode current for the at least one electrode, detect structure-borne sound oscillations of the enclosure, determine a frequency-dependent current evaluation signal and a frequency-dependent oscillation evaluation signal from the detected electrode current and the detected structure-borne sound oscillations, determine a phase shift between the current evaluation signal and the oscillation evaluation signal, respectively for a multitude of common frequencies, and to determine the measure of the mass of the part of the solid material that is caked on the enclosure from the phase shift determined.

9. The arc furnace according to claim 7, wherein the at least one structure-borne sound sensor is arranged at a minimal distance from a center line of the associated at least one electrode.

10. The arc furnace according to claim 9, wherein the device is configured to detect a supplied electrode current for the at least one electrode, detect structure-borne sound oscillations of the enclosure, determine a frequency-dependent current evaluation signal and a frequency-dependent oscillation evaluation signal from the detected electrode current and the detected structure-borne sound oscillations, determine a phase shift between the current evaluation signal and the oscillation evaluation signal, respectively for a multitude of common frequencies, and to determine the measure of the mass of the part of the solid material that is caked on the enclosure from the phase shift determined.

11. The arc furnace according to claim 9, comprising three electrodes and at least three associated structure-borne sound sensors.

12. The arc furnace according to claim 9, comprising a signal processing device coupled with said structure-borne sound sensors and said electrode current detection device.

13. The arc furnace according to claim 12, wherein signals from said structure-borne sound sensors are transmitted by an optical waveguide to said signal processing device.

* * * * *